No. 790,290. PATENTED MAY 23, 1905.
J. S. DITTY.
HALF TONE SCREEN HOLDER FOR PHOTOGRAPHIC CAMERAS.
APPLICATION FILED NOV. 25, 1904.
2 SHEETS—SHEET 2.
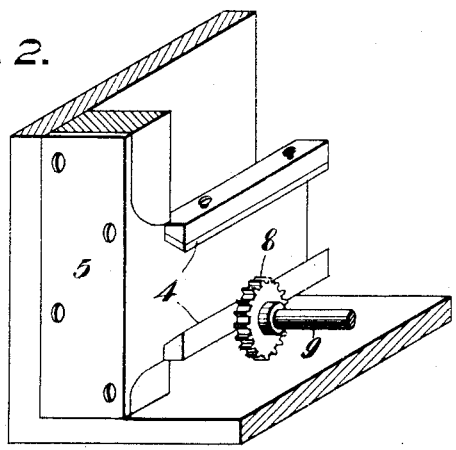
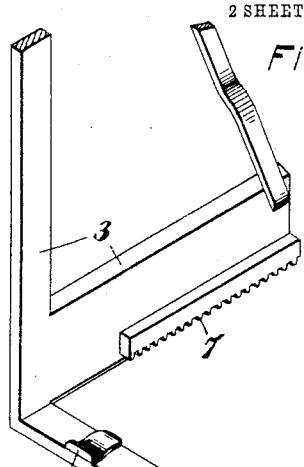
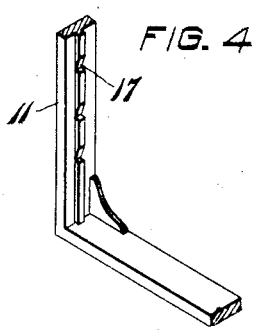
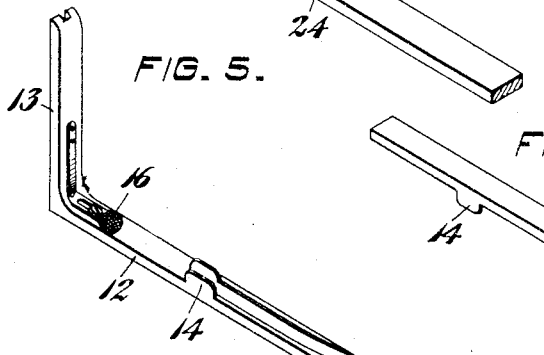
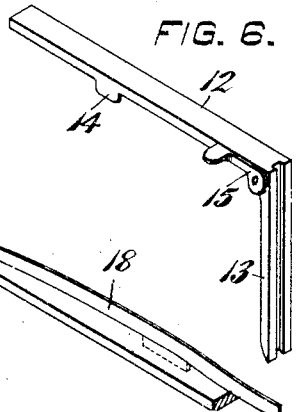
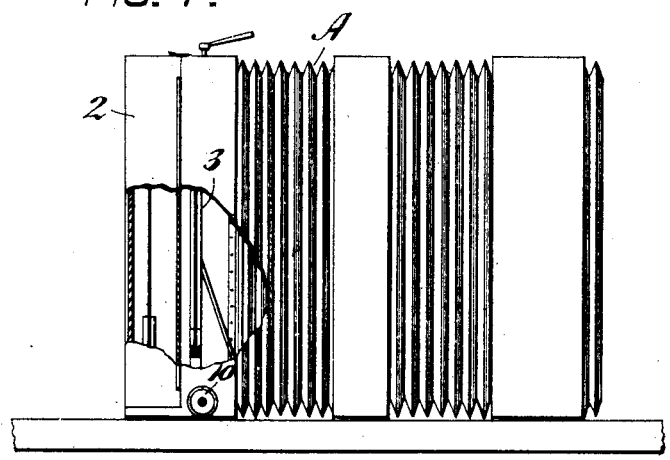
WITNESSES,
Chas. E. Chapin.
INVENTOR,
James S. Ditty
By Geo. H. Strong, Atty.

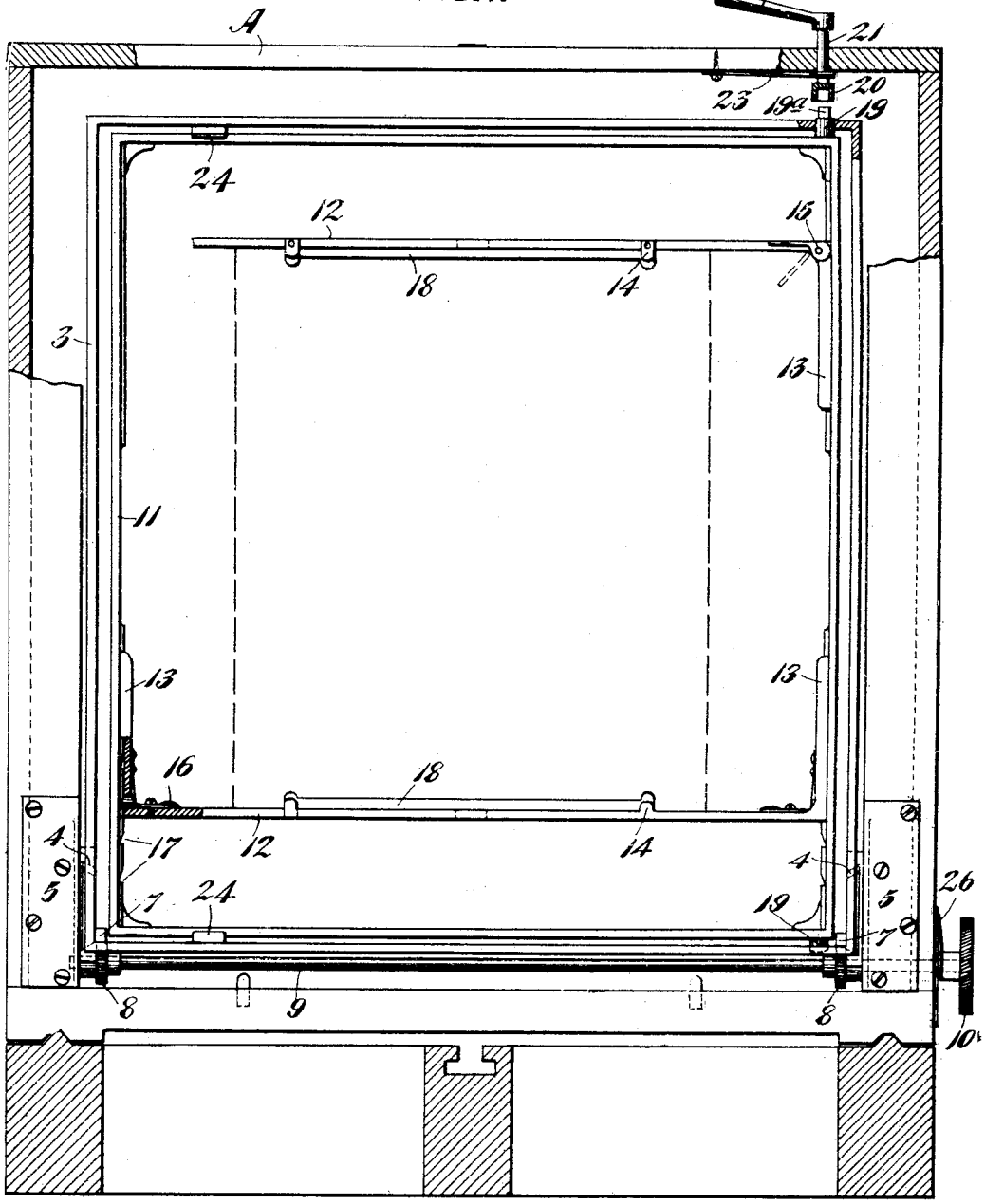

No. 790,290.                                      Patented May 23, 1905.

UNITED STATES PATENT OFFICE.

JAMES S. DITTY, OF SAN FRANCISCO, CALIFORNIA.

HALF-TONE-SCREEN HOLDER FOR PHOTOGRAPHIC CAMERAS.

SPECIFICATION forming part of Letters Patent No. 790,290, dated May 23, 1905.

Application filed November 25, 1904. Serial No. 234,234.

*To all whom it may concern:*

Be it known that I, JAMES S. DITTY, a citizen of the United States, residing in the city and county of San Francisco and State of California, have invented new and useful Improvements in Half-Tone-Screen Holders for Photographic Cameras, of which the following is a specification.

My invention relates to an attachment for cameras, and is especially designed for cameras which are employed for the production of half-tones and the like in photo-engraving.

It consists of an independently-adjustable hinged frame carried upon the camera and movable to vary the space between the screen and the photographic plate.

It comprises also the combination of mechanism and details of construction which will be more fully explained by reference to the accompanying drawings, in which—

Figure 1 is a view of camera and screen-frame, partly in section, looking toward front of camera. Fig. 2 is a perspective view of frame-guides. Fig. 3 is a perspective view of part of outside frame. Fig. 4 is a perspective view of part of inside frame. Fig. 5 is a perspective view of part of lower sliding frame. Fig. 6 is a perspective view of part of upper sliding frame. Fig. 7 is an outside view of camera, partly broken away, showing screen-plate.

Photo-engraving includes the making of negatives previous to transferring the picture to the zinc or equivalent plate from which the printing is to be done. The character of the negative may be determined as follows: Photographs, wash-drawings, oil-paintings, and all delicately-shaded copies are made in half-tone, and for this purpose a screen is interposed between the object and the sensitized plate. Pen-drawings, type, and all copies of a distinct black and white nature are made in what is termed "linework," and for this purpose it is not necessary to use the screen.

My invention is designed, first, to permit the operator to vary the distance between the screen and the sensitized plate at will, to remove the screen-frame and its parts from the plate-holder, and the danger of destroying these parts by coming in contact with the solution which will drip from the wet plates which are used. It also makes it practical to photograph both line work and half-tone on one plate. The adjustment holds the screen perfectly square with the plate, thus giving a uniform stipple over the entire plate or picture photographed.

The distance between the screen and the plate is termed "separation." By "separation" is meant that the screen may be placed in or out of focus with the sensitized plate. Thus an enlargement needs more separation than a reduction in order to have the screen in proper relation with the plate.

As shown in the drawings, A represents a camera, to the rear of which a plate-holder, as 2, is removably attached by any suitable clips or fastenings.

3 is the screen-frame, which is carried by guides 4 upon the plates 5. These plates are fixed to the end of the camera-box by having screw-holes or other fastening means. The screen-frame has fixed to it on each side a toothed rack 7, and corresponding pinions, as 8, are mounted upon a journaled revoluble shaft 9, so as to engage with the racks. By means of a thumb-wheel or equivalent device 10 exterior to the camera-case it will be seen that the shaft may be turned, and through the pinions and racks the screen-frame may be readily moved out or in, and the distance between itself and the sensitized plate can be readily adjusted independent of the camera and plate-holder.

Within the guided slidable frame 3 is carried another frame 11, and within this frame 11 is carried the adjustable screen-holding frame 12. The screen-holding frame is guided upon the inside of the frame 11, as shown at 13, the upper and lower parts of this frame being independent, as shown, and slidable to or from each other to suit the size of screen that may be required for the particular work in hand. The inner faces of the top and bottom bars of this frame have what are termed "slides" or "holders" 14, between which the screen is retained.

When the bars of the frame 12 have been adjusted to the particular sized screen, they are locked against the frame 11 by an eccentric or cam lever, as at 15, which is shown upon the upper bar of the frame, and by means of a sliding catch 16, the end of which is adapted to engage with notches, as at 17, upon the inner face of the frame 11. The frame 12 may thus be adjusted with relation to the size of screen to be used. In order to hold the screen steady in its position within the frame, I have here shown a spring 18, which presses transversely and prevents rattling or loose motion of the screen.

When it is desired to transfer linework to the sensitized plate, as previously described, it is desirable to remove the screen, so that the copy can be imprinted directly upon the plate, as previously described. In order to do this, I have shown the frame 11 as having pivots or hinges 19 at or near one of its vertical sides, and these pivots serve to swing the frame and screen entirely out of line between the copy and the sensitized plate when the latter is exposed. The screen is thus turned so that it lies substantially parallel with and against the inner side of the camera, thus leaving the interior of the camera clear for the required purpose.

The operation of turning the screen-holder and screen may be effected in any suitable manner. In the present case I have shown the top of the upper pivot 19 as being made polygonal, as at $19^a$, and this polygonal portion is engaged by a similarly-shaped socket 20, carried upon a spindle 21, extending through the top of the camera-case and having any suitable handle or means by which it may be turned, as at 22. The spindle 21 is slidable vertically, and a spring 23 acts to normally raise the socket 20 out of engagement with the head $19^a$. When it is desired to turn the screen-frame either to remove the screen from the front of the sensitized plate or to return it thereto, it is only necessary to press down upon the handle 22 until the socket 20 engages with the head $19^a$ and to then turn the handle, thus moving the screen to its desired position. As soon as the handle is released the spring will disengage the parts and the screen-frame will be held in its position by any suitable stops, as at 24.

When the photograph or other half-tone picture is to be set in a pen-and-ink or other line border or to be printed over or in conjunction with such matter, the half-tone parts are blocked out or obscured in any suitable way. This may be effected as follows: The copy is placed in a suitable holder at the front of the camera opposite the plate-holder, and this may be covered with a glass plate in the usual manner. The blacking substance can then be painted upon the glass of the copy-holder and the line parts will thus be left exposed. The screen is swung into the camera so as to stand parallel with the side and out of the way, and the line part of the copy is exposed directly upon the plate. The half-tone portion of the copy may then be exposed by cleaning the blocking substance from the glass in front of the half-tone portion of the copy and then obscuring or blocking the line portion of the copy in the same manner. The screen-plate is then swung back into the camera in front of the plate, and the half-tone parts being then exposed will be imprinted in their proper relation with the line portions previously transferred to the plate.

The operator can swing the screen parallel with the side of the camera while focusing on the ground glass if he chooses, as the focusing through the screen will make the image appear dim upon the ground glass and the change from half-tone to linework can be made at any time without removing the screen from its supports.

When the plate-holder is in position, the slide may be drawn, and by the adjusting means previously described the frame can be moved out of the camera and into the plate-holder and as close to the sensitized plate as desired or until the screen is in focus with the plate.

The wheel or turning device 10, by which the screen is adjusted, may have a mark or needle 26 upon it or a dial to show the operator the exact position of the screen.

Having thus described my invention, what I claim, and desire to secure by Letters Patent, is—

1. The combination with a camera and the plate-holder thereof of guides fixed to the camera, a frame slidable in said guides, means by which said frame is advanced or retracted with relation to the plate, a supplemental frame adjustable within the outer frame, means whereby said supplemental frame may be turned transversely to or parallel with the axis of the camera, and means by which a screen is secured to said supplemental frame.

2. In a photographic apparatus, a frame and means by which said frame is movable with relation to the sensitized plate of the camera, a second frame having vertical pivots at one side, means for securing a screen within said second frame, and means by which the screen and frame may be turned transversely to or parallel with the axis of the camera.

3. A camera having guides carried thereon, a frame and means by which it is slidable within said guides, a second frame turnable within the exterior frame to stand transversely or parallel to the axis of the camera, a screen-holding device carried by said turnable frame, said device comprising bars with screen-holding clips, and means by which said bars may be adjusted to or from each other and locked to the outer frame.

4. In a camera, fixed guides, a frame slidable within said guides, a second frame pivoted and turnable with relation to the first-named frame, guides within said second frame, upper and lower screen-holding bars having slides movable upon the guides, said bars being adapted to hold the screen in position, and clamps by which the bars are locked to the carrying-frame.

5. In a camera, guides fixed contiguous to the plate-holder, a frame movable in said guides, racks and pinions and a shaft by which the pinions are turned, whereby the frame is advanced or retracted in the camera, a second frame having vertical pivots at one side, means whereby said frame may be turned to stand transversely or parallel with the axis of the camera, vertical guides upon said turnable frame, transverse bars and locking devices adjustable upon said guides and means carried by said bars for holding and steadying the screen.

6. In a camera, guides fixed to the rear parallel with the axis, a frame having slides movable on said guides racks and pinions and a turnable shaft upon which the pinions are carried whereby the frame may be advanced or retracted, a screen-carrying frame pivoted within the slidable frame having a polygonal end to one of its pivots, a stem vertically slidable in the top of the camera, said stem having a socket in line with the polygonal pivot end and adapted to be engaged therewith when depressed, a handle by which the spindle is turned to rotate the pivoted frame into or out of the line of sight of the camera, and a spring by which the spindle is normally raised and the socket disengaged from the pivot-pin.

In testimony whereof I have hereunto set my hand in presence of two subscribing witnesses.

JAMES S. DITTY.

Witnesses:
S. H. NOURSE,
JESSIE C. BRODIE.